United States Patent [19]
March et al.

[11] Patent Number: 5,650,224
[45] Date of Patent: Jul. 22, 1997

[54] ELONGATED STRUCTURAL MEMBER AND METHOD AND APPARTUS FOR MAKING SAME

[75] Inventors: Frank A. March, Leesburg; Robert B. Taylor; John H. Menge, both of Winchester, all of Va.; Russell J. Gould, Mt. Prospect, Ill.; Thomas M. Pontiff, Winchester, Va.

[73] Assignee: Seaward International, Inc., Clearbrook, Va.

[21] Appl. No.: 724,856

[22] Filed: Oct. 3, 1996

Related U.S. Application Data

[63] Continuation of Ser. No. 90,006, Jul. 12, 1993, abandoned.

[51] Int. Cl.$^6$ .................................................. B32B 5/06
[52] U.S. Cl. .......................... 428/297; 428/36.4; 428/323; 428/327; 428/332; 428/408; 425/63; 425/65
[58] Field of Search .................. 428/35.5, 36.9, 428/36.4, 36.41, 297, 298, 323, 327, 332, 408, 303, 404, 283, 284, 103; 264/177.2, 209.8, 172, 174, 63, 46.9, 46.7, 177.3, 173, 175; 156/244.12, 244.14, 172; 425/63, 65

[56] References Cited

U.S. PATENT DOCUMENTS

| | | |
|---|---|---|
| Re. 31,354 | 8/1983 | Eckner . |
| 3,126,035 | 3/1964 | Espetvedt . |
| 3,200,554 | 8/1965 | Goodman et al. . |
| 3,253,066 | 5/1966 | Hardy et al. . |
| 3,306,960 | 2/1967 | Weissman et al. . |
| 3,342,913 | 9/1967 | Engel . |
| 3,416,810 | 12/1968 | Kennedy, III .................... 280/11.13 |

(List continued on next page.)

FOREIGN PATENT DOCUMENTS

| | | |
|---|---|---|
| A-85 701/82 | 1/1983 | Australia . |
| 540 803 | 5/1993 | European Pat. Off. . |
| 3438448 | 4/1986 | Germany . |
| WO82/00267 | 2/1982 | WIPO . |
| WO93/01034 | 1/1993 | WIPO . |

OTHER PUBLICATIONS

Roney Heinz, Civil Engineering, "Plastic Piling", vol. 63, No. 4, dated Apr. 1993, pp. 63–65.
Patent Abstracts of Japan, vol. 17, No. 80 dated Feb. 17, 1993.
International Search Report for International Appln. No. PCT/US94/07394.
Plastic Pilings Inc., "Standard Color Price Sheet", Mar. 24, 1993.
Int'l Search Report of Int'l Appln. No. PCT/US 94/07394.
Patent Abstracts of Japan, vol. 17, No. 80, dated Feb. 1, 1993.

*Primary Examiner*—Merrick Dixon
*Attorney, Agent, or Firm*—Wigman, Cohen, Leitner & Myers, P.C.

[57] ABSTRACT

An elongated structural member suitable for use as a marine piling includes a continuous, extruded plastic body having rebar disposed within the plastic body and extending in the lengthwise direction of the structural member. The structural member is formed by continuously extruding a molten plastic into a die so that the molten plastic surrounds and bonds to rebar fed into the die.

12 Claims, 4 Drawing Sheets

U.S. PATENT DOCUMENTS

| | | |
|---|---|---|
| 3,425,092 | 2/1969 | Jun Taga . |
| 3,448,585 | 6/1969 | Vogelsang . |
| 3,495,565 | 2/1970 | Gustavii . |
| 3,528,458 | 9/1970 | Gaeckel . |
| 3,606,635 | 9/1971 | Benteler et al. . |
| 3,611,736 | 10/1971 | Goodman . |
| 3,619,436 | 11/1971 | Gruss . |
| 3,630,037 | 12/1971 | Howard . |
| 3,636,718 | 1/1972 | Keats . |
| 3,639,424 | 2/1972 | Gray et al. . |
| 3,736,759 | 6/1973 | Blose . |
| 3,764,642 | 10/1973 | Boutillier . |
| 3,791,912 | 2/1974 | Allard . |
| 3,879,505 | 4/1975 | Boutillier et al. . |
| 3,922,828 | 12/1975 | Patton . |
| 3,933,960 | 1/1976 | Cameron et al. . |
| 3,978,181 | 8/1976 | Vahle . |
| 3,993,265 | 11/1976 | Parks . |
| 4,110,989 | 9/1978 | Selkirk . |
| 4,141,951 | 2/1979 | Beckman . |
| 4,146,562 | 3/1979 | Fukushima et al. . |
| 4,187,352 | 2/1980 | Klobbie . |
| 4,244,156 | 1/1981 | Watts, Jr. . |
| 4,252,471 | 2/1981 | Straub . |
| 4,306,821 | 12/1981 | Moore . |
| 4,323,528 | 4/1982 | Collins . |
| 4,351,786 | 9/1982 | Mueller . |
| 4,382,820 | 5/1983 | Inoue .......................................... 106/90 |
| 4,394,338 | 7/1983 | Fuwa ........................................... 264/135 |
| 4,465,449 | 8/1984 | Hornbeck ................................. 425/131.1 |
| 4,471,215 | 9/1984 | Blumer . |
| 4,485,057 | 11/1984 | Kristensson et al. . |
| 4,512,683 | 4/1985 | Cosenza . |
| 4,585,681 | 4/1986 | Kidera et al. . |
| 4,604,250 | 8/1986 | Ecker . |
| 4,606,953 | 8/1986 | Suzuki et al. . |
| 4,626,189 | 12/1986 | Hammer et al. . |
| 4,629,597 | 12/1986 | Charlebois et al. . |
| 4,659,255 | 4/1987 | Shiraishi et al. . |
| 4,697,957 | 10/1987 | Hellmers . |
| 4,698,193 | 10/1987 | Bernitz et al. . |
| 4,708,527 | 11/1987 | Inhofe, Jr. et al. . |
| 4,708,623 | 11/1987 | Aoki et al. ................................ 425/202 |
| 4,713,129 | 12/1987 | Inhofe, Jr. et al. . |
| 4,721,418 | 1/1988 | Queen . |
| 4,725,165 | 2/1988 | Langran . |
| 4,738,808 | 4/1988 | Hammer et al. . |
| 4,743,142 | 5/1988 | Shiraishi et al. . |
| 4,755,247 | 7/1988 | Mudge . |
| 4,762,584 | 8/1988 | Andreasen et al. . |
| 4,769,286 | 9/1988 | Le Noane ................................. 428/372 |
| 4,779,389 | 10/1988 | Landers . |
| 4,797,237 | 1/1989 | Hammer et al. . |
| 4,818,148 | 4/1989 | Takeda et al. . |
| 4,824,497 | 4/1989 | Tilman . |
| 4,824,627 | 4/1989 | Hammer et al. . |
| 4,857,371 | 8/1989 | McClintock . |
| 4,902,548 | 2/1990 | Cholat-Serpoud et al. . |
| 4,931,237 | 6/1990 | Peelman et al. ............................ 264/48 |
| 4,941,775 | 7/1990 | Benedict . |
| 4,983,072 | 1/1991 | Bell, Jr. . |
| 5,030,662 | 7/1991 | Banerjie ................................... 521/43.5 |
| 5,051,285 | 9/1991 | Borzakian . |
| 5,087,154 | 2/1992 | Crawford . |
| 5,096,545 | 3/1992 | Fink . |
| 5,096,645 | 3/1992 | Fink . |
| 5,126,167 | 6/1992 | Matsuno et al. . |
| 5,180,531 | 1/1993 | Borzakian ................................ 264/45.3 |
| 5,194,212 | 3/1993 | Bonnett ..................................... 264/513 |
| 5,202,071 | 4/1993 | Nakamura et al. ........................ 264/137 |
| 5,217,800 | 6/1993 | Pentecost ................................... 428/283 |
| 5,238,633 | 8/1993 | Jameson ................................ 264/211.23 |
| 5,273,819 | 12/1993 | Jex ............................................ 428/297 |
| 5,275,776 | 1/1994 | Hara et al. ................................ 264/257 |
| 5,282,731 | 2/1994 | Dinter . |
| 5,283,026 | 2/1994 | Okumura et al. . |
| 5,307,604 | 5/1994 | Tasso . |
| 5,308,571 | 5/1994 | Stiles et al. . |
| 5,320,788 | 6/1994 | Schneider et al. ......................... 425/1.5 |
| 5,324,377 | 6/1994 | Davies ...................................... 156/180 |
| 5,358,680 | 10/1994 | Boissonnat et al. .................. 264/177.2 |
| 5,374,385 | 12/1994 | Binse et al. ............................... 264/136 |

ELONGATED STRUCTURAL MEMBER AND METHOD AND APPARTUS FOR MAKING SAME

This is a continuation of application Ser. No. 08/090,006, filed Jul. 12, 1993, abandoned.

BACKGROUND OF THE INVENTION

A. Field of the Invention

The present invention generally relates to elongated structural members, and particularly relates to elongated structural members suitable for use as marine pilings.

B. Discussion of the Related Art

Traditional marine pilings are made of steel, concrete, or wood. Steel and concrete are very heavy and expensive and do not have desired resiliency for fendering applications. Steel is especially subject to rapid corrosion in a marine environment. Wood suffers from rapid erosion and is subject to attack by marine boring animals which deplete its effectiveness. In order to prolong its useful life, wood is typically treated with a preservative, such as creosote. However, creosote and other preservatives are detrimental to the environment. Furthermore, given the recent efforts for preservation of forests, the use of wood pilings is not desirable.

Pilings made of plastic have been proposed. For example, U.S. Pat. No. 5,051,285 to Borzakian discloses a structural plastic member suitable for use as a plastic piling. A steel pipe is positioned in a mold and coated with thermoplastic resins, fillers, and additives. The plastic is cooled and the resultant plastic member is then removed from the mold.

This approach suffers many disadvantages. Marine pilings typically vary in length from ten to eighty feet and diameter as small as three inches depending on a specific application. As a result, a piling manufacturer must either construct molds of varying sizes, which is very expensive, or use a single mold to produce pilings of a certain length and diameter and join multiple pilings longitudinally to achieve the desired length.

The use of a mold also limits the length of a piling which can be produced. The plastic in the mold must be in a flowable state throughout the entire process of filling the mold. The flowable state becomes difficult to maintain as the length and size of the structure is increased. Additionally, the adhesion of the plastic to the pipe is difficult to control in such an operation where the plastic melt is introduced at one end of an elongated mold and required to stick to the metal core pipe at the opposite end, which is typically at least ten feet away. It is believed that such a formed structure would contain hollows or at least weak areas formed by interfaces between melt streams of different relative ages.

Because the length of the member is limited by mold size, the structure disclosed in Borzakian must be connected to other such structures to form pilings of the length required for a given application. Such joining methods and means are expensive, cumbersome and leave potential seams for water and other environmental factors to attack the metal pipe core.

Accordingly, there is a need for a piling structure which is corrosion resistant or corrosion proof, impervious to marine life, has desirable structural integrity and resiliency/toughness under side impact, is environmentally safe, and preserves natural resources. There is also a need for a piling structure which can be made to a desired size without requiring multiple molds of varying sizes or the lengthwise coupling of several piling sections.

SUMMARY OF THE INVENTION

Accordingly, the present invention is directed to a elongated structural member that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the method and apparatus particularly pointed out in the written description and claims hereof as well as the appended drawings.

To achieve these and other advantages and in accordance with the purpose of the invention, as embodied and broadly described, the invention includes a continuous, extruded plastic body having a central longitudinal axis, first and second ends, and an outer peripheral surface, and at least one reinforcing element disposed within the plastic body in a position substantially parallel to the central longitudinal axis of the plastic body.

In another aspect, the invention includes a method of making an elongated structural member comprising the steps of continuously extruding a molten plastic into a die, feeding at least one reinforcing element into the die so that the reinforcing element is parallel to a longitudinal axis of the die, wherein the molten plastic entering the die surrounds and bonds to the reinforcing element, and cooling the molten plastic so that the molten plastic and reinforcing element are formed into a structural member having a predetermined cross-section.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

DETAILED DESCRIPTION

An elongated structural member of the present invention includes a continuously extruded plastic body having one or more reinforcing elements disposed within the plastic body. The structure is produced continuously by extruding a molten plastic about the reinforcing elements and cooling and shaping the plastic into the desired shape and size. The present invention is suitable for many uses, such as marine pilings, telephone poles, railroad ties, etc.

Reference will now be made in detail to the present preferred embodiments of the invention, examples of which are illustrated in the accompanying drawings.

Figure 1:
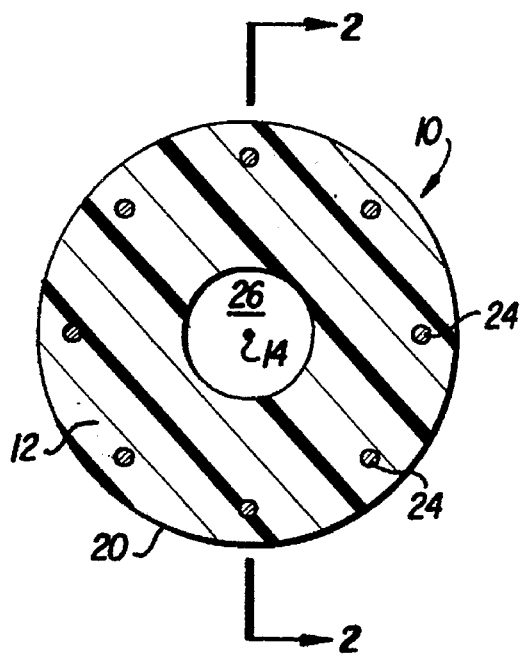
FIG. 1 is a cross-sectional view of an embodiment of an elongated structural member of the present invention.
Figure 2:
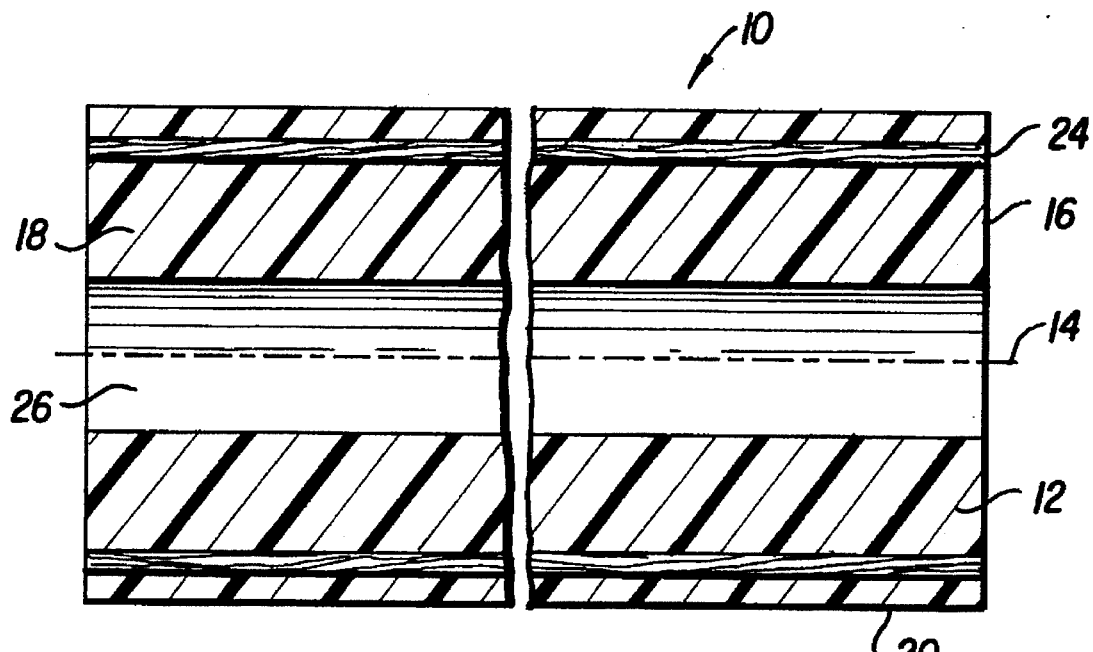
FIG. 2 is a longitudinal sectional view of the elongated structural member shown in FIG. 1 taken along the lines 2—2 of FIG. 1.

The exemplary embodiment of the elongated structural member of the present invention is shown in FIGS. 1 and 2 and is designated generally by reference numeral 10.

As embodied herein and referring to FIGS. 1 and 2, elongated structural member 10 includes a plastic body 12 and has a central longitudinal axis 14, first and second ends 16, 18, and an outer peripheral surface 20. The plastic body 12 is preferably a plastic matrix composed of suitable thermoplastic resins, such as high density polyethylene (HDPE), low density polyethylene (LDPE), linear low density polyethylene (LLDPE), polypropylene (PP), or thermoplastic polyester (PET). Virgin and recycled thermoplastic resins can be used. Recycled thermoplastic resins are preferable because of their availability, low cost, and performance. Such recycled thermoplastic resins are available from both post-consumer and post-industrial sources.

Various additives can be mixed with the plastic materials to enhance the performance of the structural member. These additives include materials, such as antioxidants, colorants, UV-protectors, fungicides and compatibilizers.

Fillers are preferably added to the plastic matrix to reduce the amount of plastic needed, provide stiffness, and, in some cases, to enhance performance. Fillers include mineral products such as calcium carbonate, talc, and silica, as well as waste products such as wood chips, saw dust, ground foam scraps, and ground paper.

The plastic matrix is preferably foamed to reduce its density by up to about 50 to 70%. Foaming can be effected by including one or more chemical blowing agents in the plastic mixture. A chemical blowing agent reacts with heat in an extruder to liberate gases, such as water vapor, carbon dioxide, and nitrogen. Typical chemical blowing agents are well known in the art and include, for example, azodicarbonamide and mixtures of citric acid and sodium bicarbonate. Physical blowing agents such as nitrogen gas, carbon dioxide, alkanes, and halogenated hydrocarbons can also be used.

Referring to FIGS. 1 and 2, a plurality of reinforcing elements 24 are disposed within the plastic body 12 and are substantially parallel to the central longitudinal axis 14 of the structural member. At least four reinforcing elements are preferably used. The diameter and composition of the reinforcing elements are chosen to give the desired strength and corrosion properties.

The reinforcing elements preferably are steel or fiberglass rods. Rebar such as those used for concrete reinforcement can be used. Steel rebar is relatively inexpensive and performs well. For increased corrosion resistance, the steel rebar can be coated with any well-known protective coatings, such as polyester (e.g., Scotch Kote™ from 3M).

For optimum corrosion resistance and metal-free (e.g., non-magnetic) construction, pultruded fiberglass rods or rebar can be used. Glass fibers are pultrusion cast continuously in a matrix of a thermoset resin such as polyester or vinyl ester.

The reinforcing elements 24 are placed in the plastic body at locations where they will contribute the most to the strength and stability of the structural member without being exposed to the environment through scraping or cutting of the structural member. The reinforcing elements are preferably placed at least one inch from the outer surface of the structure to be reasonably safe from potential exposure to environmental elements. The reinforcing elements are also preferably arranged concentrically around the central longitudinal axis 14 of the structural member, as shown in FIG. 1.

Figure 5:
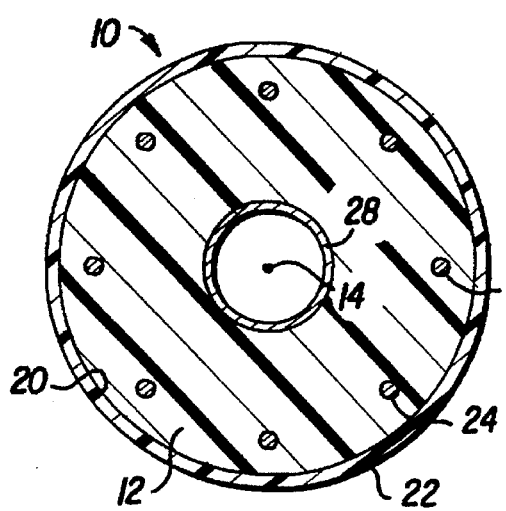
FIG. 5 is a cross-sectional view of another embodiment of the elongated structural member of the present invention.

The structural member 10 preferably also includes a central longitudinal bore 26 extending along the length of the plastic member. The central bore reduces the plastic material needed and allows for water jet driving of the structural member into the earth to serve as a piling. A metal pipe 28 may be included to line the longitudinal bore, as shown in FIG. 5. However, the inclusion of a central bore or metal pipe is not necessary for the practice of the invention.

Figure 3:
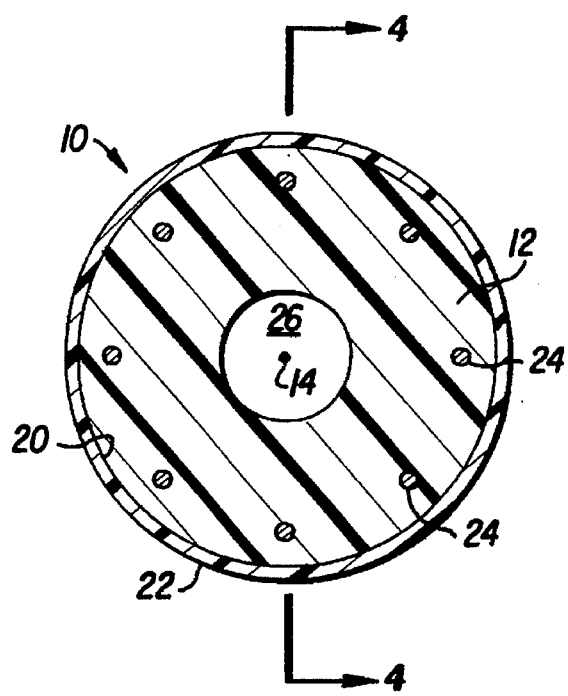
FIG. 3 is a cross-sectional view of another embodiment of the elongated structural member of the present invention.
Figure 4:
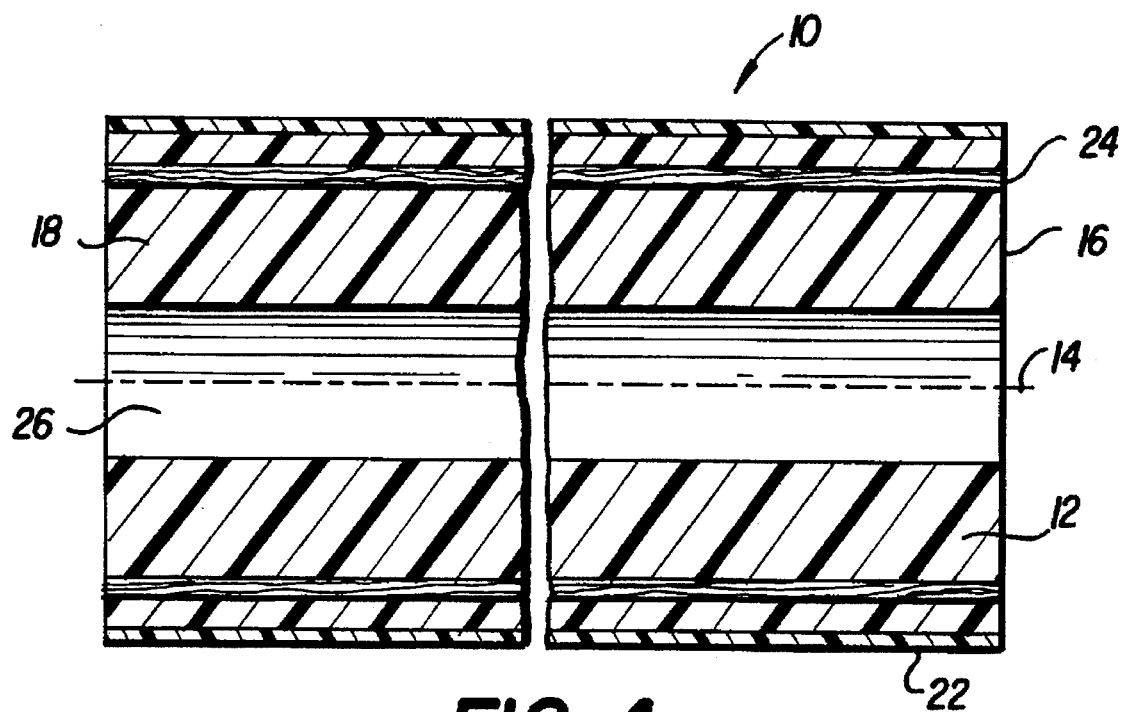
FIG. 4 is a longitudinal sectional view of the elongated structural member shown in FIG. 3 taken along the lines 4—4 of FIG. 3.

In another embodiment of the present invention, shown in FIGS. 3 and 4, the elongated structural member 10 includes a skin layer 22 formed on the outer peripheral surface 20 of the plastic body. The skin layer is preferably composed of an unfoamed plastic matrix which provides a structural, protective skin and allows the plastic body to be foamed to lower densities than if the complete structure was foamed. The matrix of the skin layer also preferably includes additives such as UV protectors, antioxidants, and fungicides, making it unnecessary to include them in the matrix of the plastic body.

Figure 6:
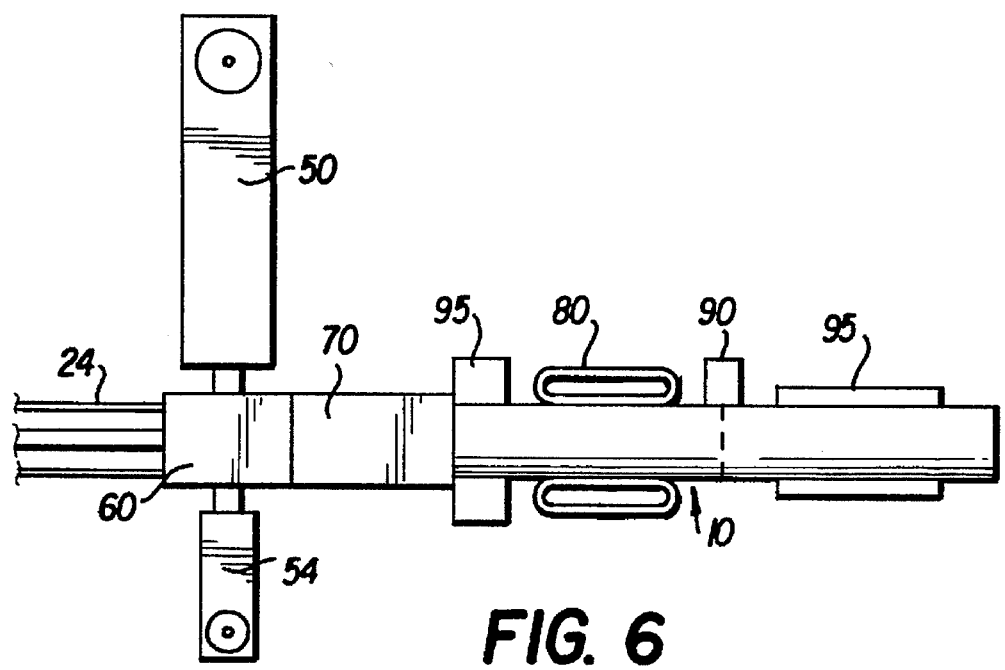
FIG. 6 is a diagram of a system for making an elongated structural member of the present invention.
Figure 7:
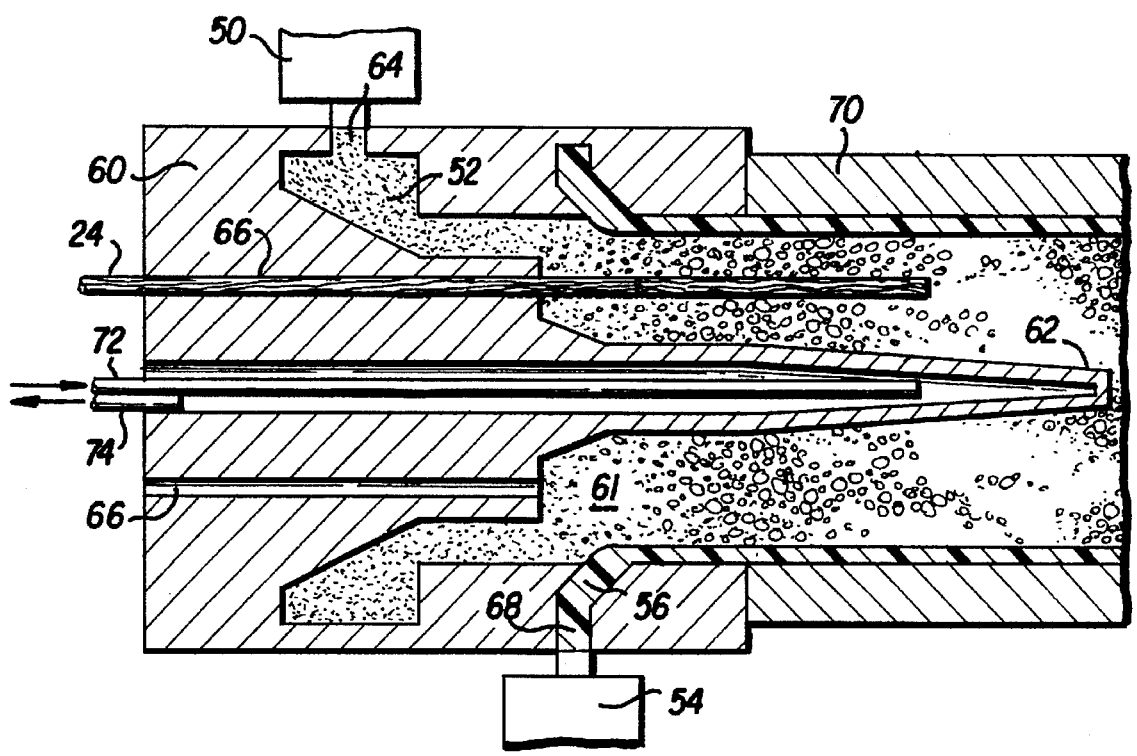
FIG. 7 is a partial longitudinal sectional view of a die used for making an elongated structural member of the present invention.

An apparatus for making the elongated structural members of the present invention is illustrated in FIGS. 6 and 7 and includes an extruder 50, die 60, shaping and cooling station 70, puller 80, and cutter 90. Additional cooling stations 95 may be included either before and/or after the puller to further cool the plastic member.

The elongated structural member is formed by feeding a desired mixture of plastic resins, fillers, additives, and blowing agent to the extruder 50. The extruder melts and mixes the components to form a melt 52, which is fed to the die 60.

FIG. 7 is a cross-sectional view of die 60, which is illustrated as a crosshead die having an interior portion 61 for receiving the molten plastic and the reinforcing elements, a hollow central mandrel 62, a lateral opening 64 coupled to the extruder 50, and a plurality of ports 66 parallel to the central mandrel 62 for receiving and supporting the reinforcing elements as they are fed into the interior portion 61 of the die 60 by a feeding apparatus (not shown). If an outer skin layer is to be formed on the plastic body, a second extruder 54 is coupled to a second lateral opening 68 of the die.

When the molten plastic first enters the die, a stopper (not shown) may be used to seal the interior portion 61 of the die to accumulate the molten plastic so that it fills the die and is pre-shaped prior to entering the cooling and shaping station 70. The stopper is moved at a constant rate through the cooling and shaping station until an initial portion of the structural member is cooled and hardened.

The melt 52 entering the die surrounds the reinforcing elements and foams from the outside in, giving a denser foam towards the skin layer 22. The density of the foam is preferably lower towards the center of the structure and higher near the outside surface to provide optimum support for the reinforcing elements, thus contributing to the overall strength of the structure. The foam density is substantially uniform, however, along the longitudinal axis of the structure.

The central mandrel allows the center of the structural member to remain hollow. Air can be introduced to the inside of the structural member through the central mandrel for better cooling and for shape retention. The central mandrel preferably extends throughout the length of the die and the cooling and shaping station in a tapered fashion, as shown in FIG. 7, to facilitate the formation of the central bore. The central mandrel may then form the central bore by circulating fluid such as water through inlet pipe 72 and outlet pipe 74 to cool the plastic near the portion of the mandrel extending into the cooling and shaping station 70. The mandrel is also preferably coated with Teflon™ to reduce friction. In this case, the plastic structure would be denser around the central bore than a similar structure having a central bore formed with air.

The extruded structural member is cooled and shaped by the cooling and shaping station 70, which may utilize a vacuum to maintain the shape. This station is a tube and shell heat exchanger which contains an opening of a predetermined cross-section which forms the structural member into a desired cross-sectional shape (e.g., circular for marine pilings, rectangular for railroad ties).

The structural member is pulled away from the die and cooling and shaping station at a controlled rate by a puller, such as a caterpillar type puller. The rate of the puller is controlled to allow sufficient foaming of the plastic mixture and to prevent deformation of the structural member due to excessive back-pressure produced in the die.

The cutter 90 cuts the structural member at the desired length when sufficiently cooled. The cutter may include a radial saw or any well-known cutting apparatus.

Figure 8:
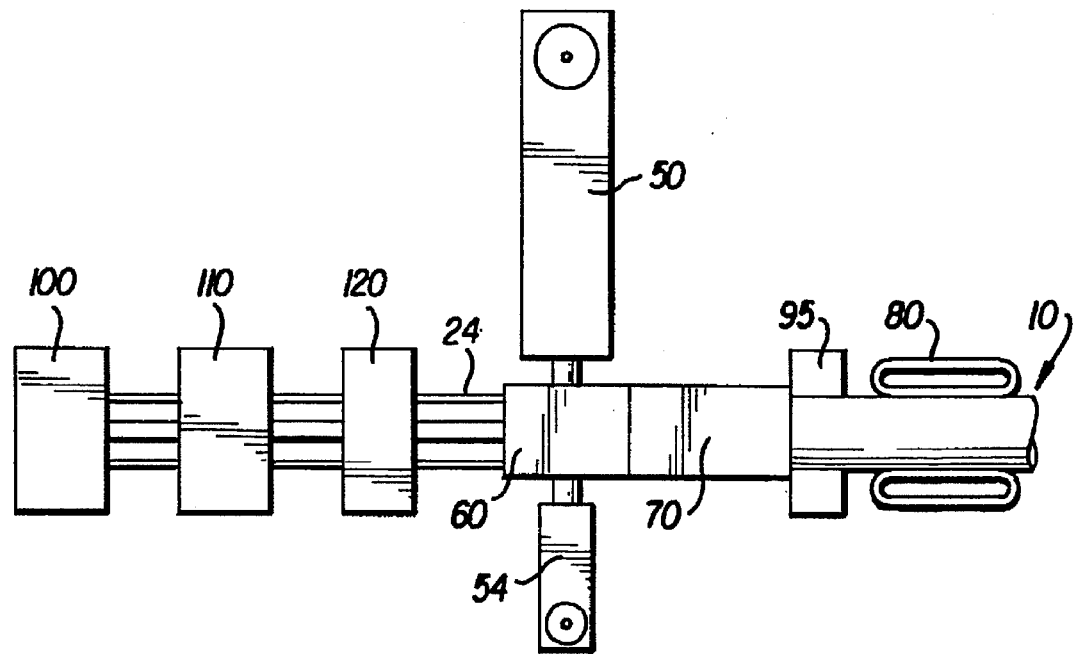
FIG. 8 is a diagram of a sub-system for forming and feeding reinforcing elements to the system of FIG. 6.

If pultruded fiberglass rods or rebar are to be used as reinforcing elements, the system shown in FIG. 6 may include additional components for forming the pultruded fiberglass rods prior to feeding them into the die 60, as shown in FIG. 8. Forming the pultruded fiberglass rods just prior to introducing them into the die reduces the space needed for storing the reinforcing elements and increases efficiency by continuously feeding the reinforcing elements into the die.

As shown in FIG. 8, a fiberglass feeder 100 contains reels or spindles for feeding individual fibers into a resin bath 110. The number of reels is variable and one or more spindles are provided for each reinforcing element to be included in the elongated structural member. Resin bath 110 includes containers for soaking each of the fiberglass fibers with a thermoset resin such as polyester or vinyl ester. The soaked fiberglass fibers are then fed into a curing and shaping die 120 which heats and shapes the fiberglass fibers (preferably two or more fibers for each rod) soaked with the thermoset resin to form pultrusion cast fiberglass rods. The rods are then fed into the die 60 and pulled along with the plastic by puller 80 through the die 60 and cooling and shaping station 70.

For use as a piling, the structural member will typically be between about ten to sixteen inches in diameter and between about thirty to eighty feet in length of continuous structure.

The continuous extrusion method of fabrication allows for substantially any length of the piling structure to be produced in an integral fashion. Additionally, the diameter or cross-sectional shape of the piling can be altered by changing the die (or portions thereof) and cooling and shaping station.

Hypothetical Example

The following is a hypothetical example of a way of practicing the present invention.

The following components are blended as the thermoplastic mixture:

25 parts (by weight) LDPE; and
75 parts HDPE.

A portion of the mixture is fed at about 500 pounds per hour to a hopper of a 4½ inch diameter extruder. In the hopper, 1.2 parts of Hydrocerol™ BIH-40 blowing agent (made by Boehringer Ingelheim) and 2.0 parts of carbon black (colorant) are added.

The mixture is extruded through a lateral opening of a crosshead die. A portion of the mixture is fed at about fifty pounds per hour to a hopper of a 1½ inch extruder, where 2.0 parts of carbon black and 0.8 parts of a UV stabilizer (e.g., Tinuvin 327 from Ciba-Geigy) are added. The melt from the larger extruder enters the crosshead die, foams and surrounds eight steel rebar of ½ inch diameter, which are fed in through the rear of the die. The melt from the smaller extruder enters the die and is extruded about the outer peripheral surface of the foaming extrudate in a uniform layer about ⅜ inches thick.

Water is introduced through the central mandrel of the die to cool the foamed extrudate and form a hollow core having a two-inch diameter. The inside diameter of the die is 13.75 inches so as to form a structural member with an outside diameter of about thirteen inches after shrinkage of the plastic during cooling. As the structural member exits the die, it immediately passes into a shaping and cooling station with an inside diameter of 13.75 inches. The shaping and cooling station is cooled with circulating water and the inside surface is coated with Teflon™ to reduce friction. The shaping and cooling station is twenty-four inches in length.

Figure 9:
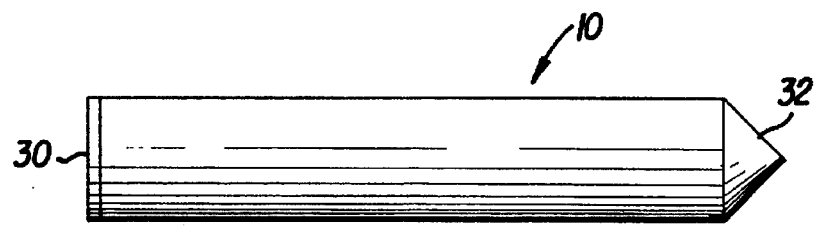
FIG. 9 is a side view of an elongated structural member of the present invention.

After exiting the cooling and shaping station, the structural member is passed through a tank of twenty feet in length where it is supported and cooled by application of water spray. The extruded profile is then sufficiently cooled to pass through a puller, constructed from six endless belts, at sixty degrees apart, which grip and pull the structural member at a constant rate of about ⅓ foot per minute. After a sufficient length of the structural member is produced, it is cut to a desired length (e.g., seventy feet) and cooled further by water. The density of the foamed matrix of the plastic body averages 0.45 grams per cubic centimeter (two times expansion). Later, the piling is capped on one end with a flat cap 30 for driving and on the other end with a conical cap 32 to penetrate the earth better during driving, as shown in FIG. 9.

It will be apparent to those skilled in the art that various modifications, and variations can be made in the elongated structural member of the present invention without departing from the spirit or scope of the invention. Thus, it is intended that the present invention cover the modifications and the variations of this invention provided they come within the scope of the appended claims and their equivalents.

What is claimed is:

1. A marine piling comprising a continuously extruded foamed plastic body having a central longitudinal axis and a substantially cylindrical peripheral surface, the body having a diameter of about ten to sixteen inches, the plastic body having first and second ends, a plurality of discrete, substantially rigid reinforcing fiberglass or steel bars each having a longitudinal axis disposed in the plastic body and extruding from end to end thereof, the longitudinal axes of the bars being arranged substantially parallel and concentric to the central longitudinal axis of the plastic body.

2. The marine piling of claim 1, wherein the reinforcing bars are located about one inch from the cylindrical peripheral surface of the body from end to end thereof.

3. The marine piling of claim 1, wherein the density of the foamed plastic body increases from the central longitudinal axis of the body to the cylindrical peripheral surface thereof.

4. The marine piling of claim 1, wherein the density of the foamed plastic body at a given radius from the central longitudinal axis thereof is substantially uniform from end to end of the plastic body.

5. The marine piling of claim 1, including an unfoamed extruded plastic skin layer on the cylindrical peripheral surface of the plastic body.

6. The marine piling of claim 1, wherein the plastic body is extruded from a mixture of high density and low density polyethylene, a blowing agent and a filler.

7. The marine piling of claim 1, including at least four fiberglass reinforcing bars.

8. The marine piling of claim 7, wherein the fiberglass reinforcing bars comprise pultruded fiberglass rebars.

9. The marine piling of claim 1, wherein the plastic body has a length from end to end of about 30 to 80 feet.

10. The marine piling of claim 1, wherein the plastic body includes a carbon black colorant.

11. The marine piling of claim 1, wherein the bars have a diameter of about one-half inch.

12. A marine piling comprising a continuously extruded foamed plastic body having a central longitudinal axis and a substantially cylindrical peripheral surface, the body having a diameter of about ten to sixteen inches and a length of about 30 to 80 feet, the plastic body having first and second ends, the density of the foamed plastic body increasing from the central longitudinal axis of the body to the cylindrical peripheral surface thereof, at least four discrete, substantially rigid reinforcing fiberglass rebuts each having a longitudinal axis disposed in the plastic body and extending from end to end thereof, the longitudinal axes of the rebars being arranged substantially parallel and concentric to the central longitudinal axis of the plastic body and being located about one inch from the cylindrical peripheral surface of the body from end to end thereof, and an unfoamed, continuously extruded plastic skin layer on the cylindrical peripheral surface of the plastic body.

* * * * *